Jan. 5, 1960   J. W. BURTON   2,919,769
FILLER FOR LUBRICATORS
Filed Feb. 2, 1956   2 Sheets-Sheet 1
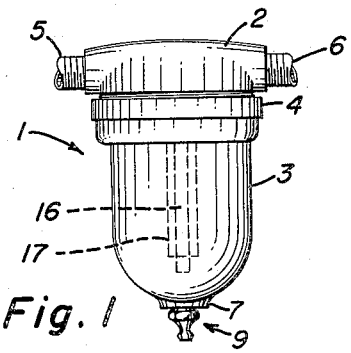
Fig. 1
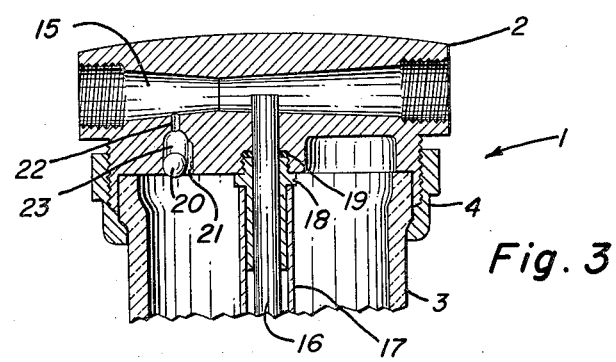
Fig. 3
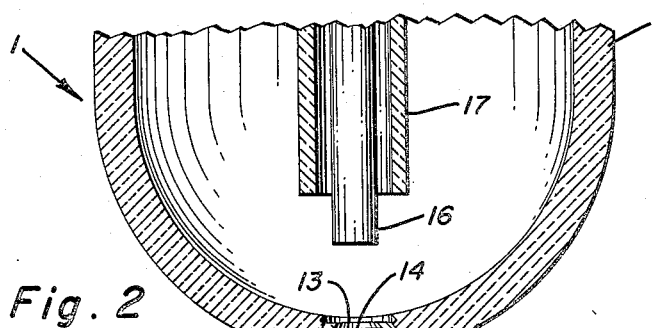
Fig. 2
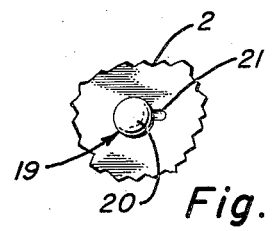
Fig. 4
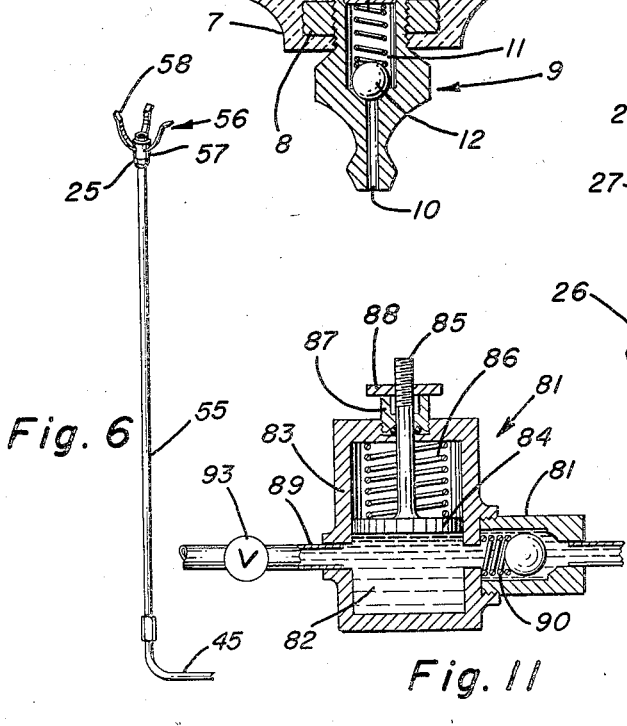
Fig. 6
Fig. 11
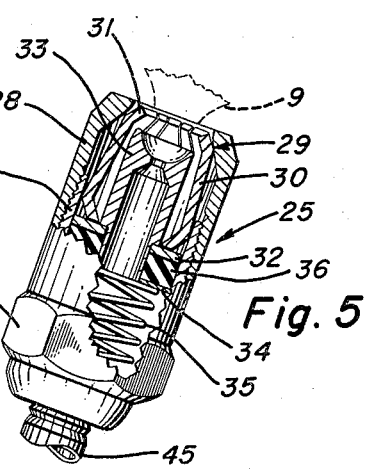
Fig. 5
INVENTOR.
John W. Burton
BY
ATTORNEY

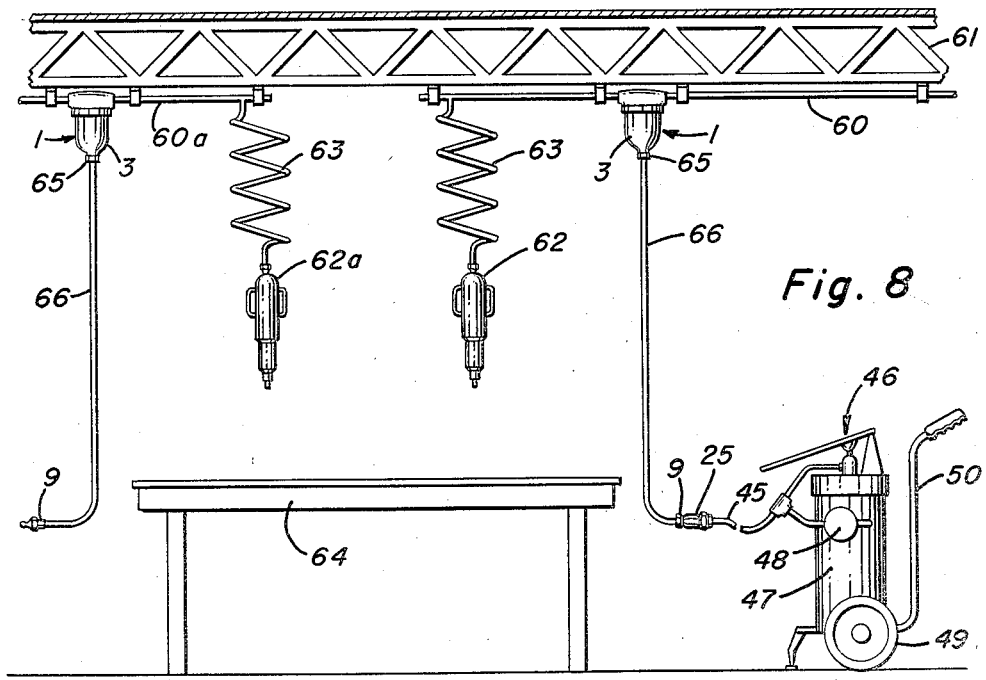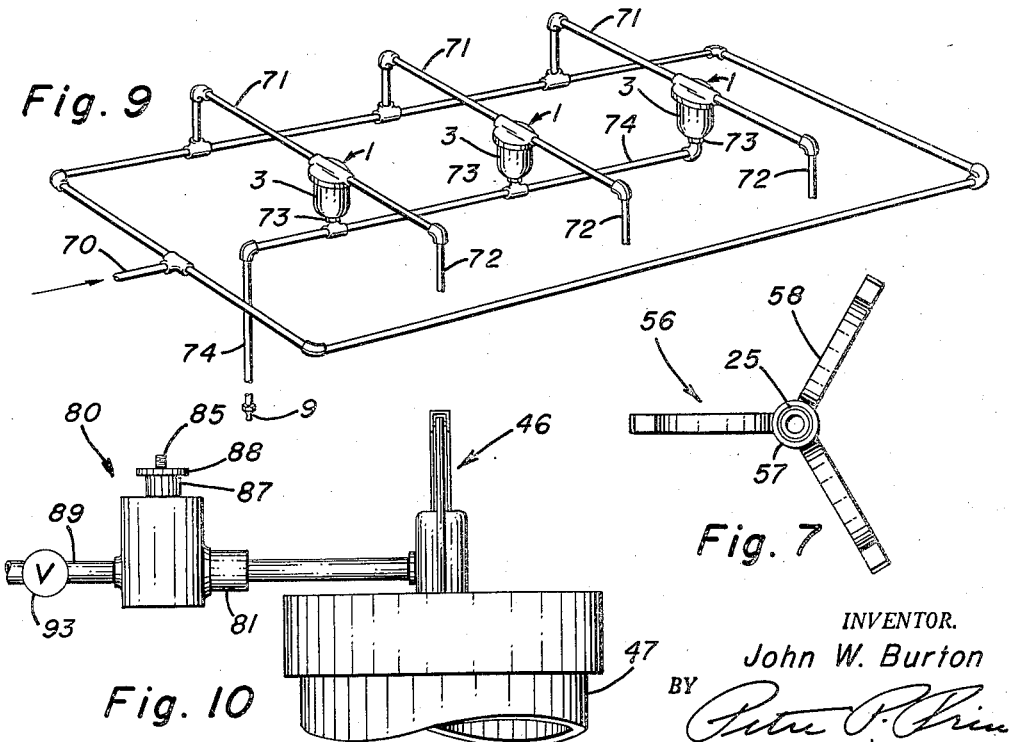

United States Patent Office 2,919,769
Patented Jan. 5, 1960

2,919,769

FILLER FOR LUBRICATORS

John W. Burton, Grand Haven, Mich., assignor to Gardner-Denver Company, Quincy, Ill., a corporation of Delaware Application February 2, 1956, Serial No. 562,990

1 Claim. (Cl. 184—55)

In modern industrial plants many operations are powered by compressed air. In some cases it is desirable and in a great many cases it is essential that the equipment operated by compressed air be properly lubricated. The most efficient method of lubricating these tools is by atomizing small quantities of lubricant into the air adjacent the tool. For this purpose separate lubricators are provided in the airlines for each tool. The lubricator basically consists of an air passage into which extends a lubricant discharging member such as a sintered wick. A bowl or reservoir is associated with the wick in which limited quantities of lubricant are stored to assure an adequate supply. While the quantity of lubricant dispensed by these lubricators will vary according to the requirements of the particular operation involved, it may be generally said that the lubricant is used in small quantities. Thus, under normal operating conditions, 2½ to 3 ounces of lubricant will supply a tool for several days.

To effect the feeding of the lubricant through the wick, it is necessary that the operating pressure of the airline be imposed on the surface of the lubricant in the bowl. While this can vary through a wide range, it is conventional practice in many industrial operations today to utilize pressure of about 90 p.s.i. This factor has created many problems in connection with the proper servicing and filling of the lubricator bowls.

Heretofore, it has been necessary to shut off the air flow and then remove a plug in the lubricator each time the lubricator bowl was filled. In large industrial plants this is such an extensive operation that it can not be completed except during working hours. When this occurs, the shutting off of the air idles the tool it operates. In a highly coordinated production line this interference with tool operation causes serious disruption in the flow of production.

Another disadvantage of present lubricator filling methods is the time consumed in filling each lubricator. The operator must first turn off the air flow. Then, with a wrench he removes the plug, fills the reservoir bowl, replaces the plug and turns the air flow on again. This consumes an appreciable amount of time. In large industrial operations where hundreds or even thousands of lubricators are in use, merely the job of filling the lubricators requires the entire services of a large crew. The cost of such a crew is in addition to the losses resulting from production interruptions.

In many industrial plants it is necessary that the lubricators be located in air lines adjacent the ceiling. Thus, they are not readily accessible and the maintenance crews servicing them must carry ladders or portable scaffolds in order to reach them. This makes the servicing operation even more time consuming and expensive. In addition, when lubricators are located directly above a work area, it is frequently necessary that the maintenance crew not only shut off the air supply but cause the operator to leave his station while the filling operation is completed. The cumulative result of all of these factors is an expensive, time consuming and unsatisfactory maintenance operation.

This invention eliminates these difficulties. By means of this invention, the lubricators may be filled in a matter of seconds while they are under operating air pressure. Thus, it is unnecessary to shut off the air and interrupt the operation of the tools. Further, this invention makes it possible to fill remote or otherwise inaccessible lubricators directly from the floor. The necessity for ladders and portable scaffolds is entirely eliminated. The filling operation on such lubricators can be completed without interference with the tools or the operator.

The invention also permits quick easy service of lubricators which are not necessarily elevated but are in an inaccessible position such as behind a machine. The operation consumes appreciably less time since the operator filling the lubricator merely has to engage a coupler to a suitable fitting, force the lubricant into the bowl, and then remove the coupler by a slight pull. All necessity for removal and the replacement of threaded plugs is eliminated. Further, because the operator frequently had to climb ladders and to carry his lubricant to rather inaccessible positions it was necessary to transport the lubricant in small containers such as oil cans. When this invention is employed, the lubricant is moved in large drums having a capacity of fifty or a hundred gallons with the lubricant being charged to the lubricator bowls directly from the drum. The drums are made readily portable by mounting them on a hand truck or small, powered conveyance. Also, the lubricant may be carried and dispensed by hand pressure guns.

This invention is adapted to the use of simple and relatively inexpensive equipment. Further its simplicity is such that an operator may be taught its use in a minimum of time. This invention permits all the lubricators in a large plant to be serviced by a small crew since one operator, using this invention, is capable of filling ten or twenty times as many lubricators as the same operator practicing the conventional method.

These and other objects and purposes of this invention will be immediately understood by those acquainted with the design and maintenance of pneumatic equipment upon reading the following specification and accompanying drawings.

In the drawings:

Fig. 1 is a side elevation view of a typical lubricator equipped with this invention.

Fig. 2 is an enlarged, fragmentary, central sectional view of the bottom of the lubricator bowl equipped with the valve fitting employed for charging the bowl with lubricant.

Fig. 3 is a large, fragmentary, central sectional view of the upper portion of the lubricator.

Fig. 4 is a fragmentary bottom view of the ball check valve appearing in Fig. 3.

Fig. 5 is a partially broken view of a coupler adapted to engage the fitting on the lubricator shown in Fig. 1.

Fig. 6 is a fragmentary, elevation view of a modification of this invention adapted to provide access to elevated or remote lubricators.

Fig. 7 is an enlarged plan view of an indexer for facilitating proper alignment of the coupler with the lubricator fitting.

Fig. 8 is a schematic, elevation view of a modified form of this invention.

Fig. 9 is an isometric, schematic view of a further modified form of this invention.

Fig. 10 is a fragmentary, enlarged view of a lubricant pump equipped with a metering device.

Fig. 11 is a central, sectional, elevational view through the metering device shown in Fig. 10.

In executing objects and purposes of this invention, there is provided a lubricator having a depending bowl, preferably of transparent material. A fitting is provided at the bottom of the bowl. This fitting has an opening whereby lubricant may be admitted to the bowl. A check valve is seated in the opening to prevent the escape of lubricant through the fitting from the bowl even when it is under normal operating line pressure.

To fill the bowl, a bulk supply of lubricant is provided such as a portable tank or container. The lubricant is withdrawn from the bulk source and placed under sufficient pressure that it will flow into the lubricator bowl against normal line operating pressure. Normally, the lubricant is placed under pressure by some type of pump. The lubricant on leaving the pump passes through a conduit, one end of which has a coupler equipped to make detachable but pressure tight engagement with the fitting on the bowl. Thus, the lubricant is forced through the coupler and fitting into the bowl. In another form of this invention, the equipment includes a long rigid tube having the coupler mounted on its end. This permits the operator to engage fittings of lubricators mounted at ceiling level. In still another form, the lubricator is equipped with a permanent conduit terminating at a fitting positioned at a convenient level. The coupler then engages this fitting to force oil through the conduit to the bowl.

Referring now specifically to the drawings, the numeral 1 designates a lubricator having a cap 2 with the bowl 3 depending therefrom and attached to the cap by the threaded ring 4 (Figs. 1 and 3). Air is supplied to the lubricator by the conduit 5 and discharged from the lubricator through the conduit 6. The bowl 3 may be of any suitable material of sufficient strength to safely withstand the operating pressures to which the lubricator is subjected. Preferably, it is of a transparent, high strength, plastic material of generally shatterproof characteristics. One preferred form of the bowl has resistance to rupture up to approximately 500 p.s.i.

At its lower end, the bowl has a boss 7 in the center of which is an opening. Surrounding the opening and embedded in the wall of the bowl is an internally threaded insert 8 for mounting the fitting 9 (Fig. 2). The fitting 9 has a head portion and a valve chamber 11. Seated in the valve chamber 11 is a ball valve 12 biased against the valve seat at the lower end of the chamber 11 by the spring 14. The other end of the spring bears against the rod 13 which extends across but does not completely obstruct the inner end of the fitting. Concentric of the head portion is a passageway 10 communicating with the valve chamber 11 and normally closed by the ball valve 12. The arrangement of the spring and ball is such that fluids introduced into the passageway 10 may pass through the fitting 9, but no flow is permitted in the opposite direction.

It will be recognized that the above description of the fitting is that of only one possible construction which may be used in connection with this invention. A flexible seal such as one of synthetic rubber may be substituted for the ball 12. In some cases it may be desirable to use a double seal fitting rather than a single seal to prevent all possibilities of leakage through the fitting under the normal operating pressure of the air line. An important feature of the fitting 9 is that it must be capable of effecting a pressure tight seal with a coupler, described hereinafter, so that lubricant being forced into the bowl 3 will pass into the passage 10 rather than escape between the head of the fitting and the sides of the coupler. The other important feature is that it must permit the flow of lubricant into the bowl 3 but prevent its escape even under high operating pressures.

While this invention may be practiced with a lubricator of conventional design to which the fitting 9 has been added, it is considered a wise precautionary measure to provide means in the lubricator to prevent the escape of excess quantities of lubricant from the bowl 3 into the air passage 15 in the event the bowl 3 is overfilled. In the particular lubricator illustrated, the lubricant is drawn from the bowl 3 into the passageway 15 by a wick 16 of any suitable material such as a rod of sintered material. The wick 16 is surrounded by a tube 17 supported at its upper end on the gland nut 18. The gland nut forms a seal about the rod by compression of the gasket 19.

Since it is necessary to maintain the same air pressure in both the bowl and the passageway 15, a bleed passage 22 is provided through the lower wall of the cap 2. In this invention, the lower end of the bleed passage 22 opens into a valve chamber 23 in the lower end of which is seated a ball valve 20. This ball 20 is prevented from dropping out of the valve chamber 19 by the restricting lip at the lower end of the chamber. When the ball is seated in the lower end of chamber 19 air passes around it by means of a slot 21 on one side (Figs. 3 and 4). The slot 21 and the bleed passage 22 need not be large inasmuch as the total quantity of air which must pass through these passages, during normal operation, is exceedingly small.

Normally, the ball 20 is seated at the bottom of the chamber 23 by gravity. However, should the bowl 3 be overfilled with lubricant, the pressure of the lubricant and its rate of introduction into the bowl 3 will be such as to lift the ball 20 against the upper end of the chamber 19, sealing the bleed passage 22. This will prevent excessive quantities of lubricant from reaching the air passageway 15.

To supply lubricant to the fitting 9 a coupler 25 is used to engage the fitting (Fig. 5). The coupler 25 has a base member 26 projecting from one end of which is an externally threaded sleeve 27. Seated over the sleeve and threaded to it is a shell 28 open at one end. At the open end, the sides of the shell are flanged inwardly forming a camming surface 29. Seated within the shell 28 is an annular sealing member 30. The end of the sealing member 30, adjacent the open end of the shell 28, has an inwardly turned flange 31 which is segmented whereby when the sealing member is forced toward the open end of the shell the flange 31 is caused to contract under the camming action of the cam surfaces 29. As a result, the sealing member 30 grips the neck portion of the fitting 9 behind the head, forming a tight pressure seal. The inner end of the sealing member 30 is seated against a slidable plate 32 within the sleeve 27. The plate 32 is separated from an inner plate 34 by a compressible washer 36 of suitable material such as rubber.

Concentrically seated within the sealing member 30 is a tubular spindle 33 shaped at its outer end to fit closely about the head of the fitting 9. The spindle 33 has a portion of reduced diameter passing through the plates 32 and 34 and the washer 36. The reduction in diameter of the spindle 33 creates a shoulder which seats tightly against the outer face of the plate 32. The plate 34 is biased outwardly by a spring 35.

In making engagement with the fitting 9, the coupler 25 is passed over the fitting. The diameter of the fitting head is greater than the opening in the flange 31 of the sealing member 30. Thus as the head enters, it spreads the flange 31. After the head has passed the flange, the flange snaps shut behind it. When lubricant under pressure is admitted to the coupler, it forces the plates 34 and 32 together with the washer 36 forwardly. This forces the flange 31 of the sealing member 30 firmly against the cam surfaces 29 causing the flange to engage the fitting with a firm, pressure tight seal.

In one form of the invention the coupler 25 is attached to the end of a flexible conduit 45. The other end of the flexible conduit is connected to a lubricant pumping mechanism 46 such as is shown on the container 47 in Fig. 8. The lubricant in the container 47 is normally under atmospheric pressure. Thus, all pressure required to force the lubricant into the bowl 3 against the operating pressure of the air in the bowl must be created by the pump 46. Should the operator continue to pump after the bowl is full the lubricant is returned to the container 47 by the pressure relief valve 48 which is set to open at a predetermined pressure.

It will be recognized that this is but one of several ways in which lubricant can be supplied to the flexible hose 45. Others will be described in connection with this invention hereinafter. To facilitate the transportation of the bulk lubricant, the container 47 is mounted on wheels 49 and is equipped with a handle 50. Thus, the operator may easily push the equipment from one station to another.

Fig. 6 illustrates a modification of this invention permitting the operator to reach inaccessible lubricators such as those mounted at ceiling level. In this case the flexible hose 45 is connected to a long, rigid tube or wand 55 at the outer end of which is mounted the coupler 25. The length of the tube 55 will depend upon the height to which the operator must reach in order to conveniently engage the fitting 9 on the lubricators to be serviced. By the use of the rigid tube 55, the operator may reach an elevated lubricator, while standing under it, by pushing the rod up until the coupler firmly engages the fitting 9. Lubricant is then introduced into the bowl until it is properly filled. The coupler 25 is disengaged simply by pulling downwardly on the rod. The entire operation of filling the lubricator is accomplished in this simple, swift operation.

To facilitate the rapid and accurate operation of the tool, the coupler 25 may be surrounded with a locating device 56. The locating device illustrated consists of a shell 57 designed to clamp about the coupler 25. Projecting from the shell are three or more resilient fingers 58 of such length and shape that before the coupler 25 engages the fitting 9, the fingers engage the sides of the bowl 3 and properly align the coupler with the fitting so that simple, upward movement will effect perfect engagement. It will again be recognized that various other types of locating or aligning devices may be used with this invention to increase the operator's speed and accuracy.

Fig. 8 illustrates a modification of this invention. In this modification, the lubricators 1 are mounted in the air lines 60 and 60a. The air lines are attached to the ceiling structure, symbolized by the girder 61, above the heads of the operator. Each of the lubricators 1 supplies a different utilizer of air, as for example the pneumatic tools 62 and 62a. The tools 62 and 62a are supported and connected to the air lines by balances 63. A typical work station is represented by the work bench 64.

Fig. 8 illustrates a situation in which it would be undesirable to service the lubricators by engaging a fitting on the bottom of the lubricator itself because such an operation might well interfere with the operators at the work station 64. Accordingly, the fittings 9 are replaced at the bottoms of the lubricators with nipples 65. To each nipple 65 a flexible or a rigid conduit 66 is attached. The conduit 66 is designed as a permanent installation. It may be shaped to parallel an adjacent post or wall structure. The conduits 66 each terminate at their lower end in a fitting 9 at a convenient height for servicing.

On the left side of Fig. 8 such a fitting is shown in closed position. On the right side of Fig. 8 the fitting is shown engaged by a coupler 25. To operate the system shown in Fig. 8, the operator brings up the tank 47, engages the coupler 25 to the fitting 9. Since the fitting 9 is located at a convenient level, this may be done with ease by the operator. The operator then pumps sufficient lubricant through the flexible hose 45 and conduit 66 to fill the bowl 3 of the lubricator. If the operator's equipment does not have a metering device, the operator will watch the level of the fluid through the clear plastic walls of the bowl to determine the quantity in the bowl. When sufficient lubricant has been pumped into the bowl, he disengages the fitting 9 by pulling the coupler 25 and then he moves on to the next station.

The entire operation is completed at floor level without interference with the operator at the work station or interruption of the operator's tools. Since the fitting 9 contains a tight check valve, the conduit 66 will remain filled with lubricant at all times.

Fig. 9 illustrates a further modification of this invention. In this arrangement a group of lubricators 1 are supplied air from a common source 70 through branch lines 71. Each lubricator supplies an individual tool or machine through a feed line 72. Each lubricator has a nipple 73 at its lower end. The nipples each connect with a common conduit 74 terminating in a fitting 9 at a remote location where it is readily accessible to service personnel. Like the conduit 66 in Fig. 8, the vertical portion of the conduit may be rigid or flexible and it may be shaped to follow a post or wall and secured thereto for support. To fill the three lubricators 1, the service operator merely couples his lubricant supply to the fitting 9 and then forces sufficient lubricant through the common conduit 74 to fill all of the lubricators 1.

The lubricators will all fill to the same level, if they are in the same horizontal plane, since the lubricant will seek a common level in all three bowls 3. It will be recognized that while the common conduit 74 is illustrated as supplying three lubricators, it may be made to service many more, the actual number being common to conduit 74 being immaterial.

It is considered desirable in many applications of this invention to provide means for metering the lubricant so that the operator does not necessarily have to observe the lubricant level in the bowl, relying upon the metering device to supply the bowl with the correct quantity of lubricant. Such an arrangement is illustrated in Figs. 10 and 11.

In this arrangement, the pump 46 at the top of container 47 is connected to a metering device 80 on its inlet end. The metering device has a check valve 81 to prevent the return of lubricant to the pump. On the discharge side of the metering device a shut off valve 93 is provided. Beyond the check valve 81, the lubricant enters a surge chamber 82 in the casing 83. Mounted for reciprocal movement within the surge chamber is the piston assembly 84 having a plunger 85. The piston assembly is biased into extended position by a spring 86. Where plunger 85 passes through the casing 83, a sealing gland 87 is provided. The outer end of the plunger 85 is threaded to receive the stop nut 88. By adjusting the stop nut 88 axially of the plunger, the length of stroke of the piston assembly 84 may be varied. In this manner, the quantity of lubricant dispensed by each operation of the metering device 81 may be varied. The lubricant is discharged from the metering device to the conduit 89 when the valve 93 is opened.

Either before or after the coupler 25 is engaged with the fitting 9, the valve 93 is closed. The operator then manipulates the pump 46 to fill the metering chamber 82. As he does this, the pressure of the lubricant forces the piston assembly 84 upwardly against the spring 86. When the piston assembly 84 reaches its maximum retracted position, the operator will be prevented from pumping any more because the incompressible character of the lubricant will increase the back pressure against the pump to the point where the pump can no longer be operated.

When the operator ceases pumping, the check valve 81 closes under the bias of the spring 90. If the coupler 25 is engaged on the fitting 9, the operator opens the valve 93. The lubricant then discharges from the chamber 82 under the pressure of the spring 86.

The quantity of lubricant dispensed by the piston 84 will be determined by the position of the nut 88, since it limits the downward movement of the piston. It will be recognized that the spring 86 must have adequate strength to place the lubricant under sufficient pressure to overcome the operating pressure within the lubricator bowl 3 and raise the column of oil from the metering chamber 82 to the lubricator. Sufficient additional pressure must be generated to cause the lubricant to flow into the bowl 3 at a relatively rapid rate.

*Operation*

Irrespective of whether the system is adapted to service each individual lubricator at the lubricator or at a remote station point or to service several lubricators as a group, the fundamental operation of this invention remains the same. The normal filler cap provided at the top of the lubricator for filling purposes is eliminated. Instead, the drain plug at the bottom of the lubricator is replaced by a suitable connection through which lubricant may be forced into the lubricator while in operation against the normal operating pressure of the system into which the lubricator is connected. In one form of this invention, this consists of a fitting 9 containing a check valve mounted in the bottom of the lubricator bowl. In the other form of this invention a conduit of suitable construction is attached to the bottom of the lubricator and the fitting with its check valve is located at the other end of this conduit at a remote point which is more readily accessible to maintenance personnel.

It will be recognized that while the check valve in the fitting 9 of the remote station type of filling system may be relied upon as the sole means of preventing the escape of lubricant, individual check valves may be provided at each lubricating bowl. Where multiple lubricators are connected to a common lubricant supply conduit and the lubricators are at different elevations, it will be essential that check valves be placed between the common conduit and each of the lubricator bowls. This will prevent the lubricant from returning to the supply conduit to seek a common level which will empty the bowls at higher elevation. It will be obvious that under these circumstances the lowest lubricator will fill first. The check valve arrangement shown in Fig. 3 is employed to prevent discharge of lubricant in the lower lubricators into the air passage while the lubricant is being forced into the higher ones.

In all cases the operator will transport his lubricant supply in bulk containers from one charging station to another. While this has been illustrated as being accomplished by use of a container mounted on a hand truck it will be recognized that any other suitable piece of equipment can be used. Irrespective of the method of transporting the bulk lubricant, some suitable type of mechanism must be provided to place the lubricant under sufficient pressure to force it into the lubricators since they will always be under operating line pressure, normally about 90 p.s.i. This may be a hand pump or a driven pump powered electrically or pneumatically. It will be recognized that other methods may be used to force the lubricant into the lubricator bowl.

In connection with the lubricant supply it is considered preferable to provide some type of metering mechanism. This will tend to reduce accidental overfilling of the lubricator bowls. This may be accomplished by a surge chamber such as that illustrated in Figs. 10 and 11. Surge chambers of other constructions may also be used of which there are many. It is also possible to accomplish this same end by use of a metering pump whether power driven or hand operated. Such a pump could supply the required amount of lubricant with one or more strokes of the handle.

Preferably, a pressure relief valve should be provided between the pump and the lubricator to prevent accidental accumulations of excessive pressure in the lubricator bowl. While these bowls, in many cases, are designed to stand pressures as for example, 500 p.s.i., it is desirable to provide a safety device in the form of a pressure relief valve which will open before this pressure is attained since the bursting of one of these bowls above an operator would not only create a serious personal injury hazard, but would spray lubricant over a wide area, possibly bringing it in contact with materials which should be free of lubricants. This again can also be accomplished by use of a pumping mechanism having a maximum pressure capacity far below the safety rating of the bowls.

It will be seen that this invention has many advantages in addition to the economies attendant the reduction of the number of personnel required to service the lubricators and the elimination of interruptions to production. The application of this invention reduces the working hazards of the plant by eliminating the necessity for maintenance personnel climbing ladders and transporting ladder equipment throughout the plant. Further, it eliminates the necessity for the maintenance personnel working above production line operators where there is always potential injury resulting from a dropped tool or part. It also eliminates potential injury resulting from careless removal of a lubricator filler plug without first turning off the air. The danger of lubricant being dripped on operating personnel or upon work pieces and benches is eliminated.

The importance of the invention is not limited to the lubricators which are inaccessible because of height. Many lubricators are located on large stationary equipment and by reason of the equipment's design must be mounted in relatively inaccessible places such as on the side or back of the machines. In many instances much time is lost by the service personnel due to the difficulty of getting at the equipment to service it. In this case the invention permits the lubricator to be adequately serviced from a remote station by the use of a conduit such as the conduit 66 illustrated in Fig. 8. Further, this can be done without interrupting the machine's operation or disturbing the machine's operator. Since conduits of the type of conduit 66 may be so arranged that they terminate at the most convenient location, the position of the lubricator can be substantially ignored in designing the equipment since the point of service for the lubricator can always be made readily accessible.

The invention has another advantage. Since all stations at which the lubricators are serviced are readily accessible and can be clearly identified, there is substantially less chance that the service operator will overlook any of them. This reduces machine and tool replacement and repair costs. In large plants this factor alone amounts to an appreciable saving.

It is to be understood from these statements that this invention is not limited to the servicing of lubricators for small, portable pneumatic tools since in its broader aspects it may be applied to any lubricator having a reservoir operated under high pressure. The invention has particular advantage when applied to pressurized lubricating systems since it permits the lubricators to be charged while under pressure. This has been one of the major problems remaining unsolved in this type of lubrication system.

It will be recognized that various other advantages of this system will be discovered as it is applied. It will also be recognized that only certain of the potential applications to which this invention may be put have been cited, and the invention is not to be considered as limited by the particular type of tools serviced by the lubricators. Accordingly, various modifications of this invention which embrace the principles herein disclosed are to be considered as included in the hereinafter appended claim unless this claim by their language expressly state otherwise.

I claim:

In combination, a lubricator having an air passage therethrough for a high pressure air line and a pressurized lubricant reservoir; means providing communication between said air passage and reservoir creating a pressure on said reservoir substantially equal to said pressure in said air passage; means for transferring lubricant from said reservoir to said air passage in response to the air pressure in said reservoir; said reservoir having a lubricant receiving port; a fitting in said port having a check valve therein adapted to prevent the discharge of lubricant from said reservoir; said means providing communication between said air passage and reservoir comprising an air channel between said air passage and said reservoir for maintaining a balance of pressure between said reservoir and said air passage; a normally open valve in said channel; said valve being adapted to close when the pressure in said reservoir exceeds that in said air passage whereby said reservoir is sealed from said air passage.

References Cited in the file of this patent
UNITED STATES PATENTS

| | | |
|---|---|---|
| 1,767,505 | Bradbury | June 24, 1930 |
| 1,795,297 | Dirkes | Mar. 10, 1931 |
| 1,979,428 | Wheeler | Nov. 6, 1934 |
| 2,130,583 | Fosnot | Sept. 20, 1938 |
| 2,425,515 | Davis | Aug. 12, 1947 |
| 2,439,053 | Moore | Apr. 6, 1948 |
| 2,524,878 | Boretti | Oct. 10, 1950 |
| 2,545,319 | Sundholm | Mar. 13, 1951 |
| 2,593,972 | Bray | Apr. 22, 1952 |
| 2,680,496 | Johnson | June 8, 1954 |
| 2,767,807 | Booth | Oct. 23, 1956 |
| 2,873,818 | Veres | Feb. 17, 1959 |